United States Patent Office 3,400,241
Patented Sept. 3, 1968

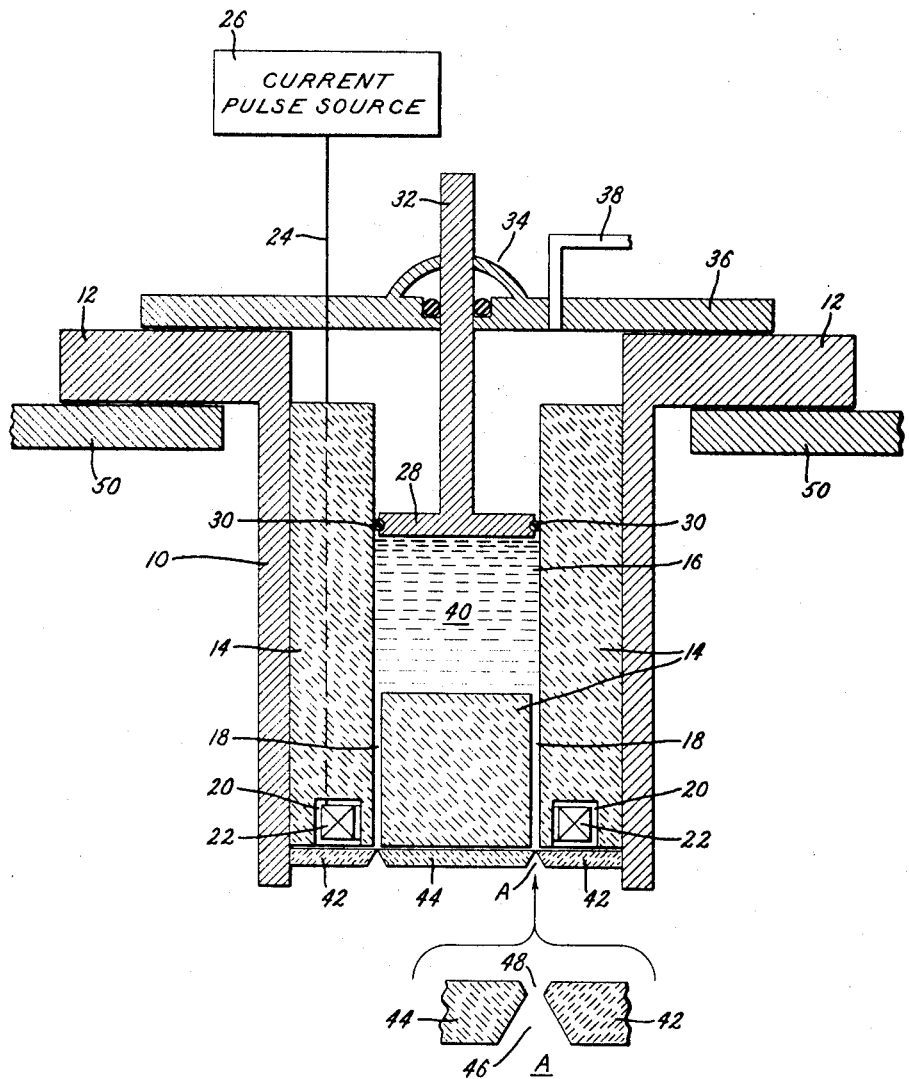

3,400,241
INDUCTIVE METAL VAPORIZER
Per Gloersen, Levittown, Bernard Gorowitz, Cheltenham, and Thomas W. Karras, Devon, Pa., assignors to General Electric Company, a corporation of New York
Filed Mar. 8, 1966, Ser. No. 532,701
4 Claims. (Cl. 219—10.65)

ABSTRACT OF THE DISCLOSURE

Store of liquid metal under pressure is connected by capillary channels to ring-shaped metering chamber provided with capillary nozzles too small to pass liquid, but passable by metal vapor. Inductor is coupled to metal-filled ring chamber, pulsed to vaporize only quantity of metal in metering chamber, generating puff of vapor out of nozzles.

---

This invention pertains to the art of producing metered quantities of metal vapor, and to the art of employing vapor discharges to produce small thrusts.

In U.S. Patent 3,350,885 it is disclosed how a liquid metal may be contained in a store and caused to fill a metering chamber connected to the store, exit from the metering chamber being provided by capillary tubes of such size that surface tension prevents the liquid metal from leaving through such capillary tubes, but vaporized metal may pass through them. It is further disclosed how electric current may be passed directly, by electrical connection with a power source, through the liquid metal in the metering chamber to vaporize it. We have invented an alternate, and, for some purposes, improved version of a metering liquid metal vaporizer in which the metering chamber is arranged to shape the liquid metal it may contain into a closed electrical path; and inductive means are provided ot vaporize the metal in the metering chamber by inducing an electrical current in it without any direct electrical connection between the liquid metal and any power source.

Our invention partakes of the virtues of the invention on which it is an improvement, and has the additional practical advantage that it makes it possible to use liquid metals which tend to react with or dissolve the materials usually employed for electrical conductors, since in embodiments of our invention all the materials which come in contact with the liquid metal may be nonconductors such as ceramic refractories or plastics. Furthermore, since the impedance presented by the inductive means may be varied nearly at will, much greater flexibility in choice of actuating voltages results from the use of our invention. These are all objects valuable to achieve.

For the better understanding and explanation of our invention, we have provided a figure of drawing in which there is represented a circular cylinder 10 of metal, which may conveniently be of copper having a flange base 12. Within 10 there is represented a ceramic block 14 of cylindrical outer shape, which may be of aluminum oxide. A circular aperture 16 extends a part of the way into block 14. From the chamber thus formed extend small tubes 18 to the face of the block. These tubes may conveniently be 0.06 inch in diameter. In the same face of block 14 to which tubes 18 lead, there is provided a ring shaped opening 20 which is concentric with the external portion of block 14 and surrounds tubes 18. Within 20 there is placed a coil 22 whose cross-section is represented simply by an X in a rectangle. Leading from the coil through an opening or tube in block 14 there is a pair of conductors 24, represented for simplicity as a single line, which extends to a current pulse source 26. A piston 28 fits within the opening 16, a fluid type seal between piston 28 and the walls of 16 being provided by O-ring 30. Piston 28 may conveniently be of stainless steel. It is mounted on a piston rod 32, which may be of the same material, and extends through a stuffing box for seal symbolically represented and generally represented by reference 34; this is a part of plate 36, through which there extends a tube 38. In operation, a quantity of fluid metal 40 is stored in aperture 16, and is maintained under pressure by the action of piston 28, as will be more fully explained hereinafter.

Adjacent to the end of 14 at which tubes 18 terminate there is close-fitted (over coil 22) a ceramic ring 42 whose internal circumference coincides with the ends of tubes 18 and is chamfered. A ceramic disc 44 almost completely fills the inner aperture of ring 42. As is represented in the enlarged view A, ring 42 and disc 44 are chamfered from both sides, forming a large approximately V-shaped ring-formed opening 46 and a smaller ring-formed opening 48 which may be of the order of 0.0005 inch in altitude, measured along the axis of disc 44 and ring 48, forming a capillary ring against the end of block 14 and connected to the ends of tubes 18. Flange 12 is fastened and sealed vacuum tight by conventional means not represented (it may conveniently be an O-ring) to plate 36 and to a vacuum chamber 50 which is represented only in part by its walls, evacuable chambers being part of well-known art and further representation being omitted for simplicity.

In beginning operation of the device, piston 28 is raised by the use of rod 32 moving in stuffing box so that piston 28 is removed from the cylindrical internal opening 16. It is understood that liquid metal 40, which may conveniently be mercury but may also be any other conveniently liquefiable metal such as an alkali metal, has previously been stored in 16. The space containing piston 28 and liquid metal 40 is then evacuated by conventional means not shown connected to tube 38, and the evacuable chamber 50 is also evacuated. Piston 28 is then inserted into aperture 16 and brought into contact with liquid metal 40. Gas, which may conveniently be some dry inert gas at a pressure of approximately one atmosphere, is then admitted through tube 38 and applies pressure to piston 28, which then transmits approximately the same pressure to liquid metal 40. This pressure causes the liquid metal to flow through tubes 18 into the ring, of capillary size, whose cross section is represented by 48 of enlarged view A. Because the greatest diameter of disc 44 is very nearly as large as the smallest internal diameter of ring 42, surface tension prevents the liquid metal from flowing out into the larger opening 46. Thus there exists a ring of liquid metal which forms a closed electrical circuit which, as may be seen from the figure, is coupled to coil or solenoid 22. If now a pulse of current is applied from the controllable current pulse source 26 through leads 24 to coil 22, a current will be induced in the ring of liquid metal which, if the pulse is of sufficient amplitude and rises rapidly enough, will induce sufficient energy to vaporize the liquid metal in the ring. Since the vapor thus formed is not retained by surface tension as the liquid metal is, it will pass into the ring of cross section 46 and then into evacuable chamber 50. Since the volume of vapor will be larger than the volume of liquid metal from which it is formed, the vapor will be accelerated between ring 48 and disc 44 and, by well known physical principles, will acquire momentum and in the process produce a thrust on the structure represented. It is evidennt that the particular embodiment here represented is merely convenient and preferable for many purposes, but capable of being replaced by other equivalents. For example, the store of liquid metal 40 might simply be exposed to the atmosphere by leaving tube 38 open to the atmosphere and eliminating piston 38 and its associated parts. Also, the geometry of the capillary closed loop form or mold formed by ring 42 and disc 44 need not be circular, provided it forms a closed loop to which a coil such as 22 may effectively be coupled. Basic requirements for the practice of the invention are a chamber such as 16 to serve to contain liquid metal, connecting means such as tube 18 sufficiently attenuated so that there is not a large mass of liquid metal so close to coil 22 as to render it difficult or impossible to induce sufficient energy in the closed loop of metal which it is desired to vaporize, induction means such as coil 22 connectable to current pulse source 26, and metering or vaporizing chamber means having a capillary exit, such as the ring shaped chamber formed by the space 48 between ring 42 and disc 44.

We claim:

1. A controllable metering source of vapor of a metal stored in a liquid condition comprising:
   (1) a chamber for containing a quantity of liquid metal;
   (2) pressure means for maintaining pressure in liquid metal in the said chamber;
   (3) a metering chamber separated from the said chamber and connected thereto by ducts, and having a form comprising at least one closed path;
   (4) capillary exit means leading from the metering chamber, sufficiently narrow to restrain from passage through, by virtue of surface tension, liquid metal from the storage chamber under pressure provided by said pressure means;
   (5) electrical induction means for inducing electric current in liquid metal in the said closed path in the said metering chamber to vaporize the said metal; and adapted to be connected to a controllable electric energy source.

2. A device as claimed in claim 1, in which the therein said metering chamber has only one closed path.

3. A device as claimed in claim 1 in which the therein said electrical induction means is a solenoid.

4. A device as claimed in claim 1 in which the therein said controllable electric energy source is a current pulse generator.

References Cited

UNITED STATES PATENTS

| | | | |
|---|---|---|---|
| 2,657,152 | 10/1953 | Mengali et al. | 117—105.1 |
| 3,260,235 | 7/1966 | Witz | 219—10.65 X |
| 3,350,885 | 11/1967 | Hall et al. | 60—203 |

FOREIGN PATENTS

| | | |
|---|---|---|
| 839,688 | 5/1952 | Germany. |

RICHARD M. WOOD, *Primary Examiner.*

L. H. BENDER, *Assistant Examiner.*